(12) United States Patent
Gasparik et al.

(10) Patent No.: US 7,082,585 B2
(45) Date of Patent: Jul. 25, 2006

(54) ANALYSIS OF INTEGRATED CIRCUITS FOR HIGH FREQUENCY PERFORMANCE

(75) Inventors: Frantisek Gasparik, Monument, CO (US); Joseph J. Brehmer, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 306 days.

(21) Appl. No.: 10/718,829

(22) Filed: Nov. 21, 2003

(65) Prior Publication Data

US 2005/0114806 A1 May 26, 2005

(51) Int. Cl.
*G06F 17/50* (2006.01)
(52) U.S. Cl. .................. 716/4; 716/1; 716/5
(58) Field of Classification Search ............ 716/1, 716/3, 4, 5; 228/110.1; 703/13, 14
See application file for complete search history.

(56) References Cited

U.S. PATENT DOCUMENTS

| | | | | |
|---|---|---|---|---|
| 6,161,215 A | * | 12/2000 | Hollenbeck et al. | 716/15 |
| 6,539,531 B1 | * | 3/2003 | Miller et al. | 716/15 |
| 6,564,355 B1 | * | 5/2003 | Smith et al. | 716/4 |
| 6,845,491 B1 | * | 1/2005 | Miller et al. | 716/1 |
| 2003/0115568 A1 | * | 6/2003 | Miller et al. | 716/15 |

* cited by examiner

*Primary Examiner*—Stacy A. Whitmore
*Assistant Examiner*—Binh Tat
(74) *Attorney, Agent, or Firm*—William W. Cochran, LLC

(57) ABSTRACT

Disclosed is a method of analyzing an integrated-circuit system that is accurate for high frequency analysis and can predict problems at high frequencies that do not occur when the circuit is used at lower frequencies.

6 Claims, 7 Drawing Sheets

ANALYSIS OF INTEGRATED CIRCUITS FOR HIGH FREQUENCY PERFORMANCE

BACKGROUND OF THE INVENTION a. Field of the Invention

The present invention generally pertains to analysis of transmission systems of integrated circuits and more particularly to analysis of transmission systems of integrated circuits at frequencies greater than 1 GHz.

b. Description of the Background

Transmission systems of integrated circuits are often analyzed before they are fabricated to ensure the desired characteristics will appear in the final design. When a system is designed to use a clock circuit with a frequency below 1 GHz, a software tool such as Hspice or Ansoft Q3D is commonly used to estimate system parameters and ensure the system will provide the desired results before mass-manufacturing the system.

Below 1 GHz, frequency dependent parameters, that have a negligible effect at low frequencies, often become significant concerns at higher frequencies. If the effect of these parameters is not reflected in the system design, the effect may remain hidden from system designers and users until the system has been manufactured. Correcting such an unexpected effect after manufacture may cause problems for the system manufacturer.

It would therefore be advantageous to have a method of analyzing an integrated-circuit system that is more accurate at high frequencies. It would further be advantageous if such a method could predict problems at high frequencies that do not occur at lower frequencies.

SUMMARY OF THE INVENTION

The present invention overcomes the disadvantages and limitations of the prior art by providing a method of modeling and analyzing high frequency integrated-circuit transmission systems, including the integrated circuits themselves, and that can be used in conjunction with commercial software tools to predict and correct problems at high frequencies that do not occur when the circuit is used at lower frequencies.

The present invention may therefore comprise a method of analyzing the effects of a high frequency transmission system comprising: modeling a high frequency signal source as an ideal voltage source and a resistance and capacitance circuit; modeling bond wire connections within the transmission system using an equivalent resistance, capacitance and inductance circuit; modeling an integrated-circuit package in the transmission system using an equivalent resistance, capacitance and inductance circuit; modeling a package stub in the transmission system as an unterminated transmission line; and, selecting a package trace such that the length of the package stub is sufficiently short so that transmission line effects of the package stub occur at a frequency higher than the highest-expected frequency used by the package trace.

The present invention may further comprise a device that minimizes transmission line effects of high frequency electrical signals through an integrated-circuit transmission system made by a process comprising: modeling a high frequency signal source as an ideal voltage source; modeling bond wire connections within the integrated-circuit transmission system using an equivalent resistance, capacitance and inductance circuit; modeling an integrated-circuit package using an equivalent resistance, capacitance and inductance circuit; modeling trace wire connections between a printed circuit board and the integrated-circuit package using an equivalent resistance, capacitance and inductance circuit; modeling a package stub within the integrated-circuit package, which acts as an unterminated transmission line between a package connector pad and an edge of the integrated-circuit package; and, selecting a length of the package stub so that any transmission line effects of the package stub occur at a frequency higher than the highest-expected frequency used by the integrated-circuit package.

The advantages of the present invention are that analysis of a high frequency integrated-circuit system can be accurately performed and attenuation of high frequency signals can be reduced using the modeling techniques of the present invention.

DETAILED DESCRIPTION OF THE INVENTION

Figure 1:
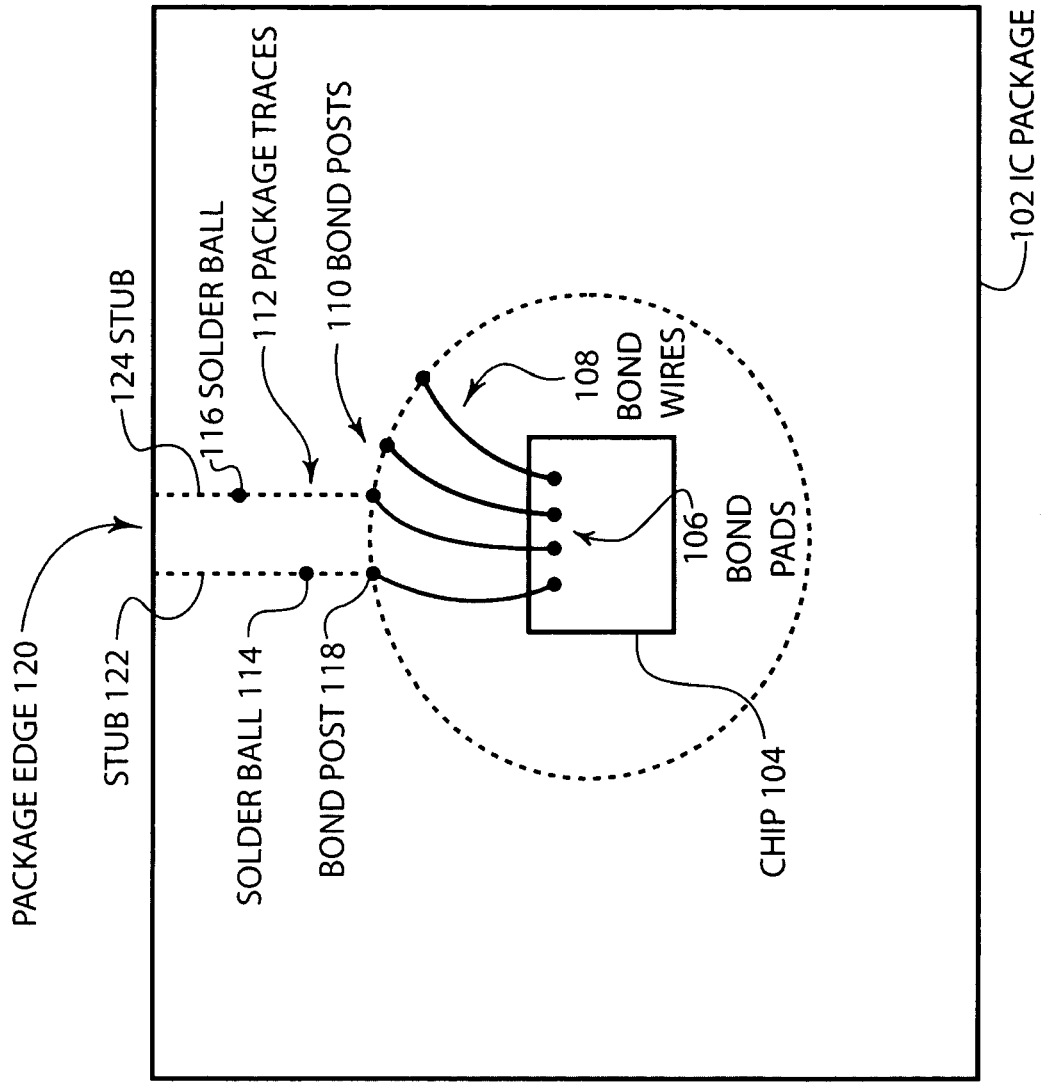
FIG. 1 is a top view of an integrated-circuit package and chip.

FIG. 1 illustrates the top view of a typical integrated-circuit (IC) package 102 and an integrated circuit (IC) chip 104 mounted on IC package 102. The chip 104 has a series of bond pads 106 that provide an electrical connection to the chip 104. Bond wires 108 are connected to bond pads 106 on the chip 104. Bond wires 108 connect to a ring of bond posts 110 on the integrated-circuit package 102. The bond posts 110 of the IC package 102 are connected to package traces 112. The package traces 112 are disposed in various layers of the IC package 102 and provide connections to solder balls, such as solder ball 114, that are disposed on the bottom of the IC package 102. In addition, the package signal traces 112 extend to the package edge 120 from the solder balls, such as solder balls 114, 116. The portion of the package trace 112 that extends from the solder balls to the package edge 120 is referred to as the stub. For example, stub 122 extends from the solder ball 114 to the package edge 120. Similarly, stub 124 extends from the solder ball 116 to package edge 120. The stubs provide a method, during manufacturing of the IC package 102, to insure that there is proper conductivity of the package traces 112. So, for example, during manufacture and testing of the IC package 102, a test device is connected to the stub at the package edge 120 to test conductivity between the stub and the bond post. More specifically, one lead of an ohm meter may be connected to stub 122 at the package edge 120 and the other lead of the ohm meter can be connected to bond post 118, to determine if there is proper conductivity. Each of the package traces 112 is tested in this manner during the manufacture of the IC package 102. Hence, the stubs, such as stubs 122, 124, merely function as a connector to test the package traces 112 and are left unterminated at the package edge 120.

Figure 2:
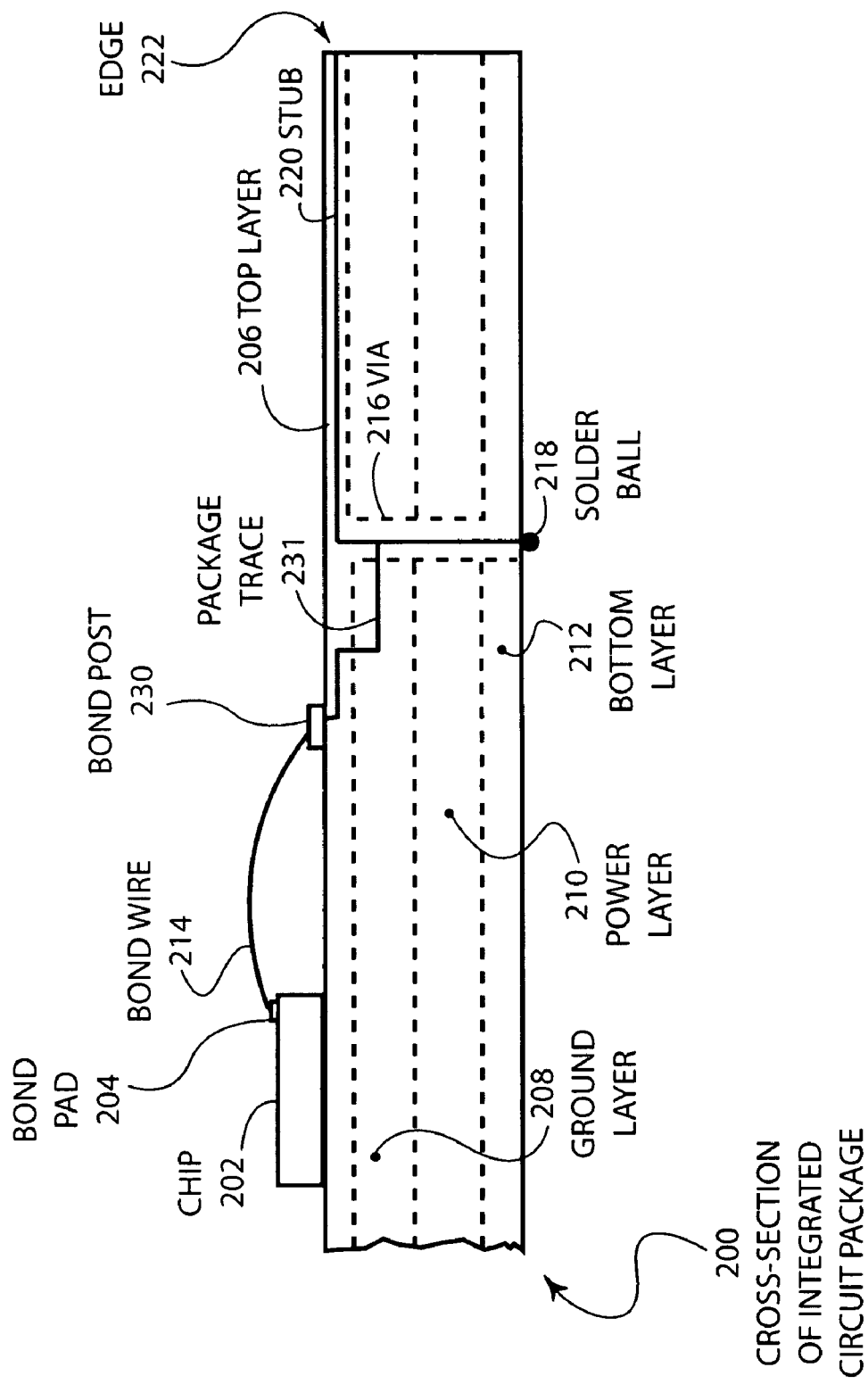
FIG. 2 is a cross-sectional view of the integrated-circuit package of FIG. 1.

FIG. 2 is a cross-sectional view of an integrated-circuit package 200. The chip 202 is located on the top of top layer 206. The second layer 208 is typically an electrical ground layer. The third layer 210 is normally the electrical power layer. The bottom layer 212 and the top layer 206 typically contains signal traces. As shown in FIG. 2, chip 202 has a bond pad 204 that provides an electrical connection to connect the chip to other devices. Bond pad 204 may have a bond wire 214 connected to the bond pad, which in turn, is connected to a bond post 230, that is part of the integrated circuit package 200. Bond post 230 is electrically connected to a package trace 231. Package trace 231 may extend in the top layer 206 of the integrated circuit package 200 for a distance, as shown in FIG. 2, and then may extend in another layer, such as ground layer 208, prior to proceeding downwardly in via 216. Via 216 extends to a solder ball 218 located on the bottom surface of the integrated circuit package 200. The package trace 231 may extend from the solder ball 218, on the bottom surface of the integrated package 200, to the top layer 206. The package trace 231 then extends to the edge 222 of the integrated circuit package through the top layer 206. The portion that extends from the solder ball 218 to the edge 222 is referred to as stub 220. Via 216 provides a connection through the top layer 206, the ground layer 208, the power layer 210 and the bottom layer 212.

Figure 3:
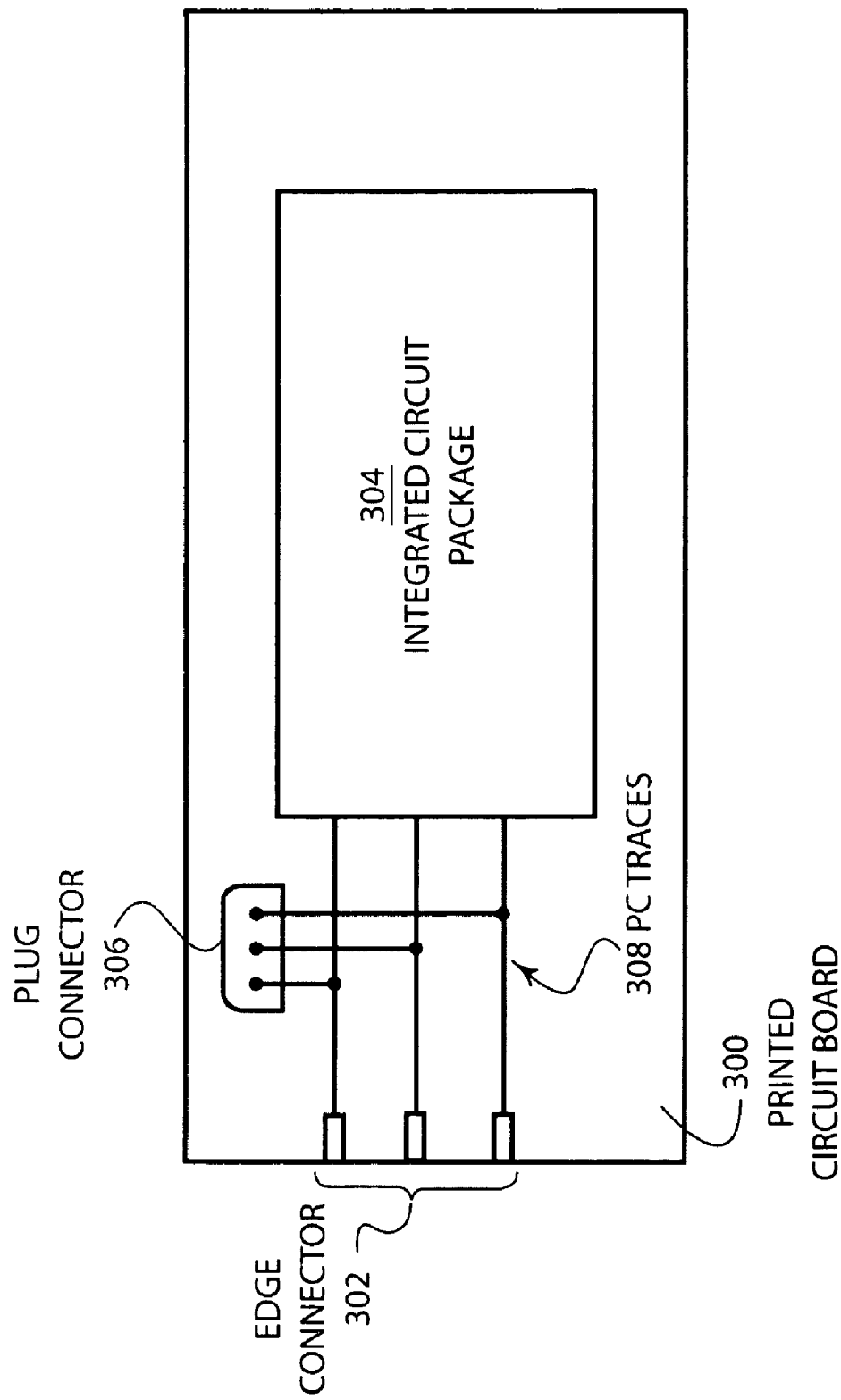
FIG. 3 is a top view of a printed circuit board with an attached integrated-circuit package.

FIG. 3 is a top view of a printed circuit board 300 having an integrated circuit package 304 mounted thereon. The integrated circuit package 304 may have a series of printed circuit board traces 308 on the printed circuit board 300. These traces may extend to an edge connector 302, or to a plug connector 306. In other words, the printed circuit board traces 308 may provide alternative ways of connecting to the integrated circuit package 304. Although only three printed circuit board traces 308 are shown, numerous traces may actually exist. As shown in FIG. 3, the alternative connections normally create additional unterminated stubs on the printed circuit board 300. For example, if the printed circuit board 300 is connected through the edge connector 302, the plug connector 306 is normally not connected to anything. Hence, unterminated stubs may exist on the printed circuit board 300. In addition, the PC traces 308 on the printed circuit board 300 also can be modeled for their equivalent RLC circuit, although the PC traces 308 are normally not a significant source of cross talk.

Figure 4:
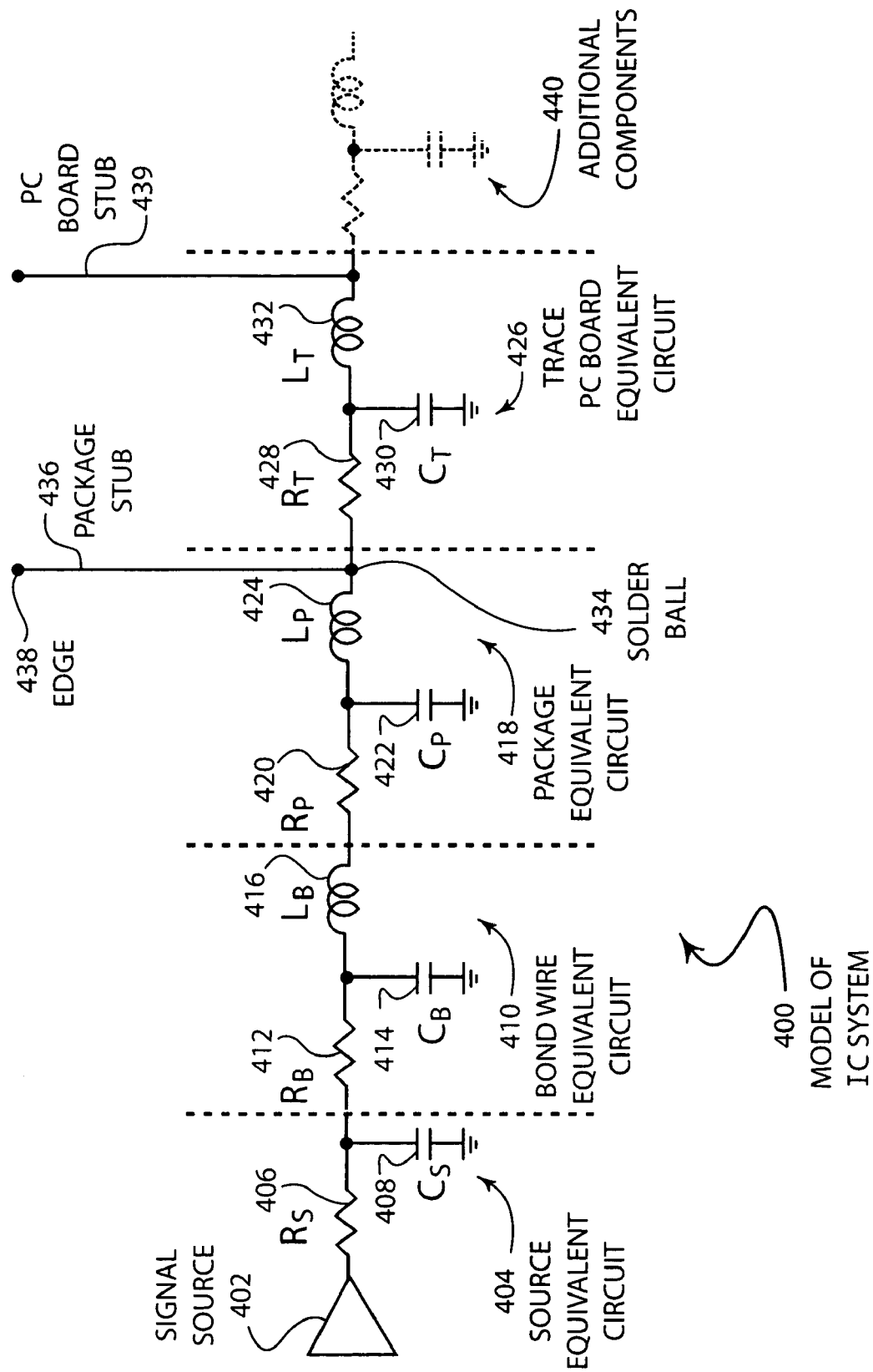
FIG. 4 is an illustration of a model of an integrated-circuit package.

FIG. 4 is a model of an IC transmission system 400. As indicated above, software tools such as Hspice or Ansoft Q3D can be used to estimate various system parameters. However, such system parameters must have a model in which the data generated from the software programs can be used. The model illustrated in FIG. 4 provides equivalent circuits for the components encountered by a signal that is generated by a chip and transmitted through an integrated circuit package to a printed circuit board and then to additional components. A source equivalent circuit 404 is provided which models the signal source 402 of the integrated circuit chip as an ideal voltage source. The equivalent circuit for the source 404 also includes a resistance ($R_S$) 406 and a capacitance ($C_s$) 408. The bond wire 214 (FIG. 2), which is connected to the chip 202 (FIG. 2) and to bond post 230 (FIG. 2), has a bond wire equivalent circuit 410 which comprises resistance ($R_B$) 412, inductance ($L_B$) 416 and capacitance ($C_B$) 414, as illustrated in FIG. 4. Similarly, the integrated circuit package 200 (FIG. 2) has a package equivalent circuit 418, that comprises a resistance ($R_P$) 420 and inductance ($L_P$) 424 and capacitance ($C_P$) 422.

Figure 5:
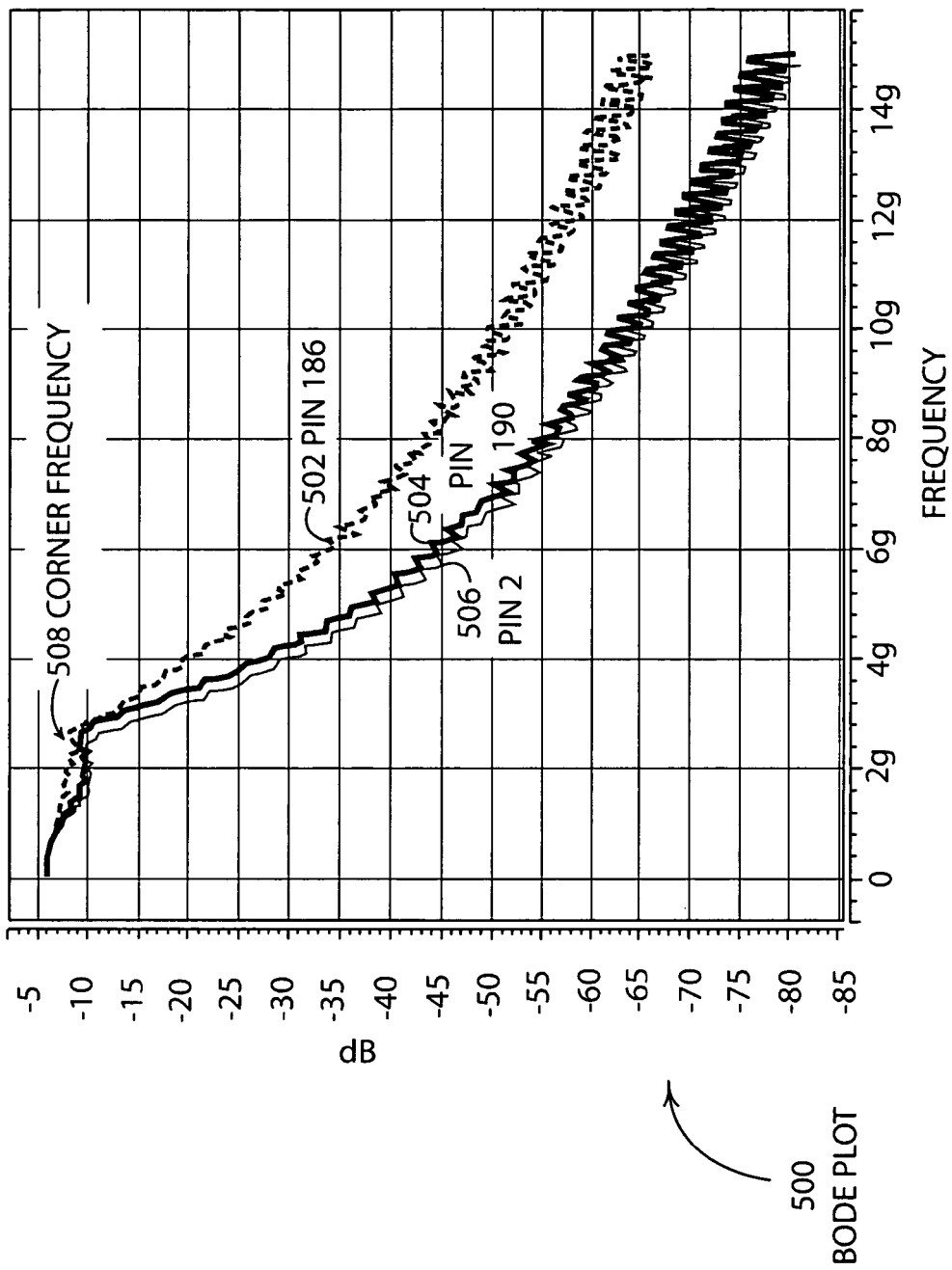
FIG. 5 is an illustration of a typical frequency response curve (Bode plot), of signal inputs to an integrated-circuit system, as calculated using a standard lumped-parameter model.

FIG. 5 is a Bode plot 500 of the predicted response of a signal modeled by the combination of source equivalent circuit 404, bond wire equivalent circuit 410 and package equivalent 418. The three curves 502, 504 and 506 are plots of the predicted frequency response using a standard lumped-parameter model. The lumped parameter model predicts the response of the source equivalent circuit 404, bond wire equivalent circuit 410 and package equivalent circuit 418. At low frequencies, the model of these three equivalent circuits is sufficient to predict the response of the entire integrated circuit transmission system. These modeling procedures for basic components are adequate up to about 1 GHz frequency. Of course, Fiber Channel, Serial Attached SCSI (SAS) and other communication systems operate now with clock rates in excess of 1 GHz and with data rates of 8 Gbits per second and higher. The frequency spectrum of such fast signals spans from low frequencies to well over 10 GHz.

Modeling of even basic circuit components, such as resistors, with one constant value results in gross inaccuracies in predicting the system behavior at high frequencies. Inclusion of skin effect, in approximating the conductance, is a function of frequency, and improves the modeling of system performance. In addition, advanced three-dimensional analytical tools can extract lumped RLC parameters with a high degree of accuracy. As indicated above, the lumped parameter model yields frequency responses, such as shown in FIG. 5, with one or two pole approximations. Above the corner frequency, determined by the pole, the response continues to roll off with a −20 dB/decade or −40 dB/decade slope to infinity.

As indicated above, FIG. 5 illustrates a predicted response of an integrated circuit system using a high performance plastic ball grid array (PBGA) package, which is commonly used for communication ICs, employing a lumped parameter model for an equivalent circuit (FIG. 4). One of the problems with the lumped-parameter model is that it fails to predict any physical events such as reflections, resonances, etc. above the corner frequency. Hence, the frequency responses predicted by the lumped parameter model, shown in FIG. 1, can provide incorrect results. Using prior predictive analysis techniques can result in the inability to recognize problems with high frequency systems. Failure of a system, which could not be anticipated prior to implementation and evaluation of the system, constitutes a failure in the design analysis process. Redesign of modern communication systems, such as Fiber Channel and Serial Attached SCSI, can be costly and can cause delays in time to market of the product.

Referring again to FIG. 5, plot 502 illustrates a predicted response of pin 186 on the PBGA using the lumped parameter model. Plot 504 predicts the response of pin 190 of the PBGA. Plot 506 predicts the response of pin 2 of the PBGA. Of course, the method of analyzing responses, as disclosed herein, is not limited to PBGA packages, but can be used with printed circuit boards, strip lines, microstrip signal traces, connectors, cables, etc. The PBGA is merely an example of the manner in which the processes disclosed herein can be advantageously used to predict actual responses.

Referring again to FIG. 5, pin 2 has a stub length of 2.1 millimeters. Again, this distance is the distance between the solder ball 218 and the edge 222, shown in FIG. 2. Since the edge 222 is simply a connection that allows testing for connectivity of the package trace 231, the stub 220 (FIG. 2) is unterminated at edge 222. Pin 190 has a stub length of approximately 5 millimeters. Pin 186 has a stub length of approximately 8.5 millimeters. Of course, the shorter the length of the package stub 220, normally the longer the package trace 231 from the bond post 230 to the solder ball 218, as shown in FIG. 2. The longer the package trace 231 between the bond post 230 and the solder ball 218, the higher the predicted RLC using the lumped parameter model. For example, for pin 2, which has the shortest stub length, the calculated RLC parameters are: R is approximately 0.21 ohms, L is approximately 5.4 nH and C is approximately 1.33 pF. Pin 186, on the other hand, has the longest stub length, approximately 8.5 millimeters. The extracted RLC parameters for pin 186 are: R is approximately 0.06 ohms, L is approximately 1.1 nH and C equals 1.4 pF. Using these parameters, the response of these traces is shown in FIG. 5.

As also shown in FIG. 5, there is no signal integrity problem except for the noticeable effects of the response for signal attenuation due to the RLC extracted parameters. Each of these RLC parameters can be extracted using Ansoft Q3D software, or an equivalent that accurately models the frequency response of the components at high frequencies.

Figure 6:
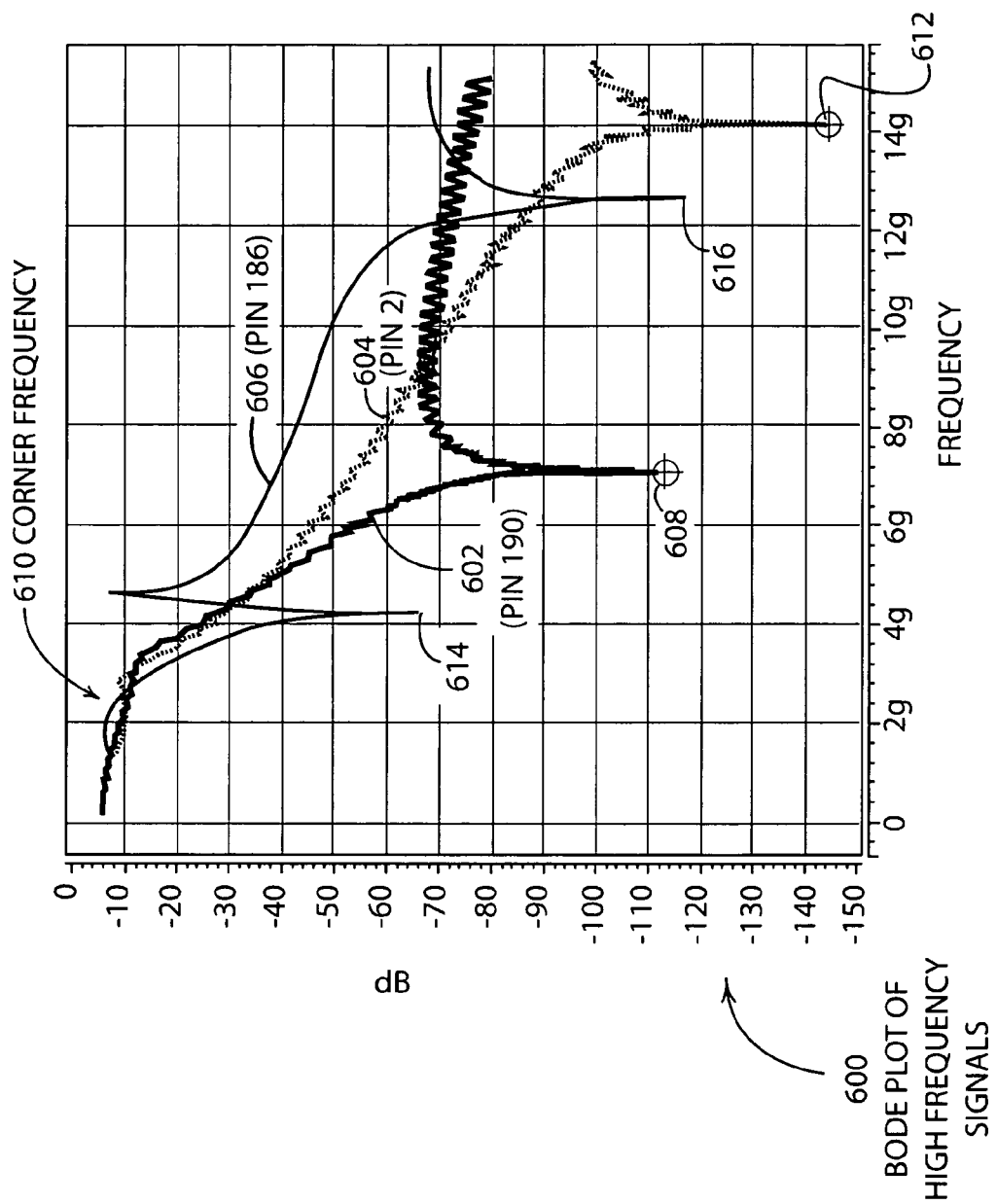
FIG. 6 is a Bode plot of signal inputs of an integrated-circuit system.

However, the actual response of the package at 1.5 GHz is shown in FIG. 6. Curves 602, 604 and 606 differ significantly from the predicted responses of FIG. 5. In particular, the FIG. 6 curves 602, 604 and 606 display a sudden sharp attenuation at points 608, 612, 614 and 616 respectively. Each point of attenuation appears at a frequency greater than the apparent corner frequency 616 and is not a predicted response. Signals transmitted at any of the frequencies where sharp attenuation occurs for that particular conductor, i.e. points 614 and 616 for pin 186 (response 606), point 608 for pin 190 (response 602) or point 612 for pin 2 (response 604), are greatly attenuated, causing malfunctions or failures within a given integrated-circuit package.

Referring again to FIG. 5, the least amount of predicted attenuation is provided by Pin (186) 502, since this pin minimizes the length of the package trace between the bond post 230 and the solder ball 218, which increases the length of the package stub 220 between the solder ball 218 and the edge 222 of the integrated-circuit package. Minimizing the length of the package trace 231 between the bond post 230 and the solder ball 218 has been thought to minimize the attenuation of the signal and such results were predicted by the Bode plots of FIG. 5.

The modeling illustrated in FIG. 4, however, predicts the actual measured effects shown in FIG. 6. The package stub 220 acts as an unterminated transmission line between the solder ball 218 and the edge 222 of the integrated-circuit package. Transmission line theory teaches that when an unterminated conductor has a length that is an odd integer multiple of the quarter wavelength of the signal being transmitted through the unterminated wire, the unterminated wire acts as a short circuit. Thus, in FIG. 4, the package stub 436 is included in the equivalent circuit 418 of the package. By selecting a package trace with a short package stub 436, the frequency at which transmission line effects is created may be beyond the highest frequency of signal expected to be used in a given integrated-circuit transmission system. Hence, the IC system model illustrated in FIG. 4 includes the package stub 436 as part of the package equivalent circuit 418 to accurately predict the transmission line effects of the package stub 436. The model illustrated in FIG. 4 also includes a PC board equivalent circuit 426. As shown in FIG. 4, the PC board trace equivalent circuit includes a resistive component ($R_T$) 428, an inductive component ($L_T$) 432 and a capacitive component ($C_T$) 430. In addition, the printed circuit board may include PC traces 308 (FIG. 3) that include PC board stubs 439. A PC board stub 439 may function in the same manner as the package stub 436 to cause a transmission line effect that severally attenuates signals. As also shown in FIG. 4, additional components 440 may be modeled as part of the IC system that is modeled in accordance with FIG. 4.

Referring again to FIG. 6, using PIN 2 (trace 604) as the package trace 231, which has the shortest package stub, moves the short-circuit frequency to approximately 14 GHz, allowing any signal frequency below 14 GHz to be used in the system without creating transmission line effects in that signal.

Referring again to FIG. 2, when connecting a chip 202 on an integrated-circuit package 200, the chip 202 should be connected to a package trace 231 that has package stub 220 having a length that is sufficiently short to avoid the transmission line effects illustrated in FIG. 6. Again, this process deviates from the predicted models of FIG. 5 which suggest the selection of package trace with the shortest length between the bond post and the solder ball, but which typically has the longest stub.

Figure 7:
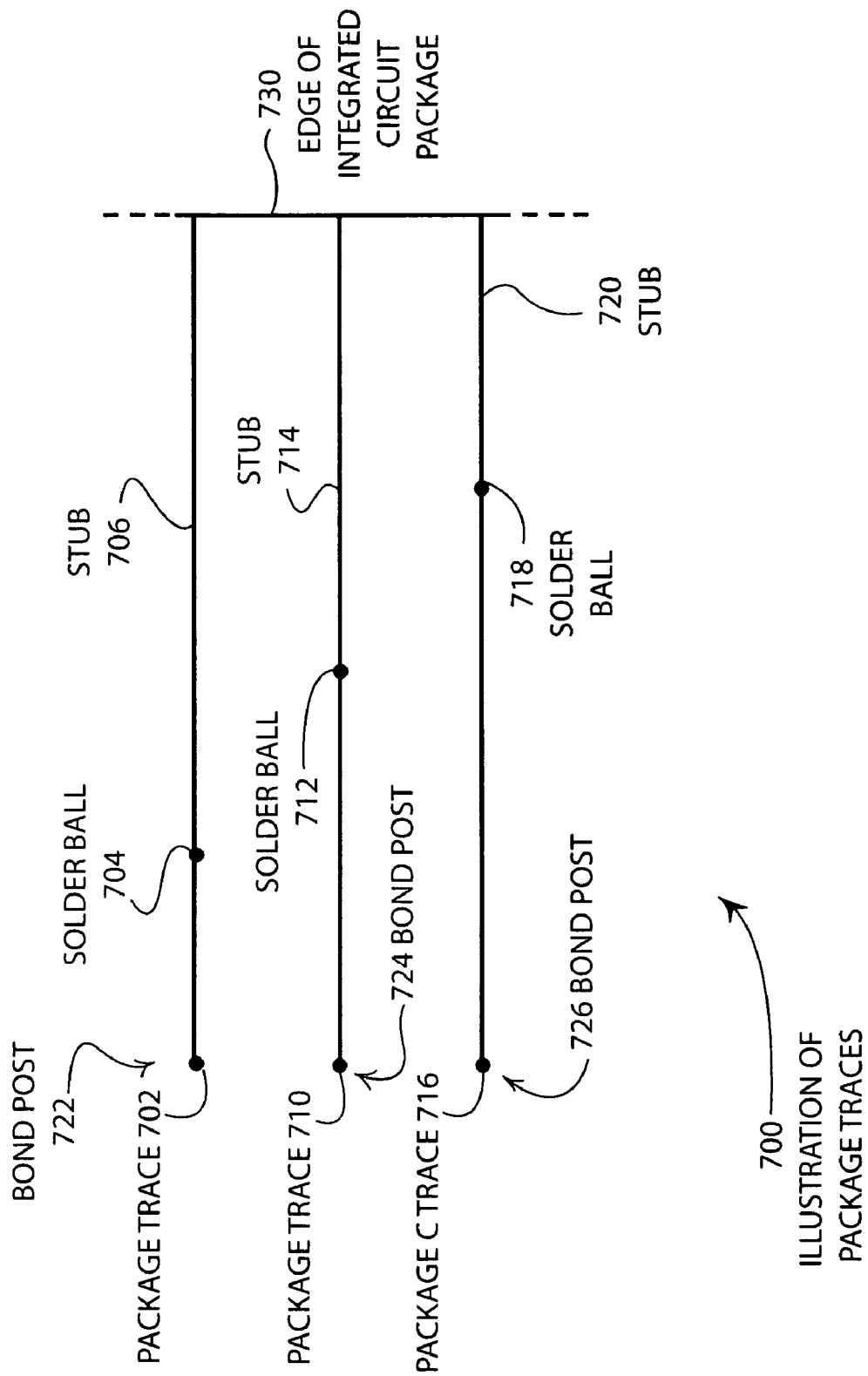
FIG. 7 is an illustration of package traces showing long and short package stubs.

FIG. 7 is an illustration of various package traces 700. Package trace 702 has a short length between bond post 722 and solder ball 704. However, package trace 702 has the largest stub 706. Package trace 710 has an intermediate length from bond post 724 to solder ball 712, and an intermediate length stub 714. Package trace 716 has a long length between bond post 726 and solder ball 718. However, package trace 716 has the shortest stub 720.

Hence, the three package traces 702, 710 and 716 disclosed in FIG. 7 illustrate the fact that, in general, as the length of the package trace between the bond post and the solder ball increases, the length of the stub shortens. Since it is normally desirable to have a short trace length between the bond post and the solder ball, it is counterintuitive to select a package trace, such as package trace 716, which has a long length between bond post 726 and solder ball 718 for higher frequency signals, since the equivalent RLC circuit will have a greater impedance between the bond post 726 and solder ball 718, than a package trace such as package trace 702 which has a lower equivalent circuit impedance between bond post 722 and solder ball 704. However, the short length of package trace 702, between bond post 722 and solder ball 704, creates a long stub 706. If a low frequency signal is applied to package trace 702, the length of the stub 706 is likely to be irrelevant. However, if the signal path 702 is used for high frequency signals, and the quarter wavelength is an odd integer multiple of the length of the stub 706, transmission line effects will occur and the attenuation created by stub 706 as a result of transmission line effects may severely attenuate such a high frequency signal.

In other words, high frequency signals should employ package trace 716, which has the shortest stub 720 of the three signal paths in FIG. 7. Stub 720 will cause transmission line effects at the highest frequency of the three package traces 702, 710 and 716. By treating the stubs 706, 714 and 720 as unterminated transmission lines and selecting signal traces in accordance with the the frequency of the signals traveling on the package traces 702, 710 and 716, signals can be transmitted in the package without creating unexpected transmission line effects and severe attenuation. Similar techniques of analyzing the PC board stub 439, in the integrated circuit and any other stubs that exist in the IC system and integrated circuit can be used to insure that severe attenuation does not occur as a result of transmission line effects.

The present invention therefore provides a method for analyzing a high frequency transmission system to avoid transmission line effects. By selecting a trace with a short stub length, the frequency at which transmission line effects appear is higher. If the highest signal frequency applied to that trace is lower than the frequency at which transmission line effects occur, transmission line effects will be prevented.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of analyzing the effects of a high frequency transmission system comprising:
   modeling a high frequency signal source as an ideal voltage source and a resistance and capacitance circuit;
   modeling bond wire connections within said transmission system using an equivalent resistance, capacitance and inductance circuit;
   modeling an integrated-circuit package in said transmission system using an equivalent resistance, capacitance and inductance circuit;
   modeling a package stub in said transmission system as an unterminated transmission line; and,
   selecting a package trace such that the length of said package stub is sufficiently short so that transmission line effects of said package stub occur at a frequency higher than the highest-expected frequency used by said package trace.

2. The method of claim 1 further comprising:
   modeling a trace wire of a printed circuit board in said transmission system using an equivalent resistance, capacitance and inductance circuit.

3. The method of claim 2 further comprising:
   modeling a printed circuit board stub as an unterminated transmission line; and
   selecting a printed circuit board trace such that the length of said printed circuit board stub is sufficiently short so that transmission line effects of said package stub occur at a frequency higher than the highest expected frequency of a signal applied to said trace wire.

4. A device that minimizes transmission line effects of high frequency electrical signals in an integrated-circuit transmission system made by a process comprising:
   modeling a high frequency signal source as an ideal voltage source;
   modeling bond wire connections within said integrated-circuit transmission system using an equivalent resistance, capacitance and inductance circuit;
   modeling an integrated-circuit package using an equivalent resistance, capacitance and inductance circuit;
   modeling trace wire connections between a printed circuit board and said integrated-circuit package using an equivalent resistance, capacitance and inductance circuit;
   modeling a package stub within said integrated-circuit package, which acts as an unterminated transmission line between a package connector pad and an edge of said integrated-circuit package; and,
   selecting a length of said package stub so that any transmission line effects along said package stub occur at a frequency higher than the highest-expected frequency used by said integrated-circuit package.

5. The device of claim 4 further comprising:
   modeling trace wires of a printed circuit board in said transmission system using an equivalent resistance, capacitance and inductance circuit.

6. The device of claim 5 further comprising:
   modeling a printed circuit board stub as an unterminated transmission line; and
   selecting a printed circuit board trace such that the, length of said printed circuit board stub is sufficiently short so that transmission line effects of said package stub occur at a frequency higher than the highest expected frequency of a signal applied to said trace wire.

* * * * *